United States Patent
Kasuya

(10) Patent No.: US 11,895,432 B2
(45) Date of Patent: Feb. 6, 2024

(54) RECORDING CONTROL APPARATUS, RECORDING CONTROL METHOD, AND RECORDING CONTROL PROGRAM

(71) Applicant: JVCKENWOOD Corporation, Yokohama (JP)

(72) Inventor: Junichi Kasuya, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 8 days.

(21) Appl. No.: 17/698,328

(22) Filed: Mar. 18, 2022

(65) Prior Publication Data

US 2022/0217298 A1 Jul. 7, 2022

Related U.S. Application Data

(63) Continuation of application No. PCT/JP2020/033575, filed on Sep. 4, 2020.

(30) Foreign Application Priority Data

Sep. 26, 2019 (JP) ................. 2019-175085

(51) Int. Cl.
*H04N 5/765* (2006.01)
*G06V 20/40* (2022.01)
(Continued)

(52) U.S. Cl.
CPC ............ *H04N 5/765* (2013.01); *G06V 20/44* (2022.01); *H04N 7/183* (2013.01); *G07C 5/02* (2013.01)

(58) Field of Classification Search
CPC .......... H04N 5/765; H04N 7/183; H04N 5/77; H04N 5/92; H04N 7/18; H04N 9/8205;
(Continued)

(56) References Cited

U.S. PATENT DOCUMENTS

2018/0007323 A1* 1/2018 Botusescu ............ H04N 9/8045
2018/0357484 A1* 12/2018 Omata .................. G08G 1/167

FOREIGN PATENT DOCUMENTS

JP 2019-040364 3/2019
JP 2019-117518 A 7/2019

OTHER PUBLICATIONS

International Search Report for the corresponding PCT Application No. PCT/JP2020/033575 with English translation dated Oct. 6, 2020, 4 pages.

(Continued)

*Primary Examiner* — Thai Q Tran
*Assistant Examiner* — Nienru Yang
(74) *Attorney, Agent, or Firm* — Shih IP Law Group, PLLC

(57) ABSTRACT

In a recording control apparatus, an event detector detects that an event occurs, when a save-triggering event, which is defined to trigger saving of the video data, occurs or when an marking event, which is different from the save-triggering event and for which it is defined that a point of time of detection thereof should be recorded, occurs. A recording controller records, when the marking event is detected, the point of time of detection of thereof. When the save-triggering event is detected within a standby period defined in association with the marking event after detection of the marking event, it is defined that video data including a video at the point of time of detection of the marking event and a video at a point of time of detection of the save-triggering event should be saved.

8 Claims, 6 Drawing Sheets

(51) Int. Cl.
*H04N 7/18* (2006.01)
*G07C 5/02* (2006.01)

(58) Field of Classification Search
CPC .......... G06V 20/44; G07C 5/866; G07C 5/02; G08G 1/0104; G08G 1/205
USPC ....................................................... 348/148
See application file for complete search history.

(56) References Cited

OTHER PUBLICATIONS

International Preliminary Examination Report on Patentability (I) for the corresponding PCT Application No. PCT/JP2020/033575 with an English translation dated Mar. 15, 2022, 8 pages.
Extended European Search Report from EP Application No. 20870198.7 dated Oct. 18, 2022, 8 pages.

\* cited by examiner

RECORDING CONTROL APPARATUS, RECORDING CONTROL METHOD, AND RECORDING CONTROL PROGRAM

CROSS REFERENCE TO RELATED APPLICATION

This application is a continuation of application of International Application No. PCT/JP2020/033575, filed on Sep. 4, 2020, and claims the benefit of priority from the prior Japanese Patent Application No. 2019-175085, filed on Sep. 26, 2019, the entire content of which is incorporated herein by reference.

BACKGROUND OF THE INVENTION

1. Field of the Invention

The present invention relates to a recording control apparatus, a recording control method, and a recording control program configured to record information such as a video capturing a scene around a vehicle.

2. Description of the Related Art

Recently, vehicles having an apparatus called a drive recorder mounted thereon have increased. In the event that an accident or a trouble occurs around the vehicle, video or audio recorded in a drive recorder during a travel can contribute to determination of a cause of the accident or to solution of the trouble.

[patent document 1] JP2019-040364

The function of saving a video that captures a serious incident such as an accident and a trouble by going back a certain period of from since its occurrence have been known (see, patent literature 1). However, an event that causes a serious incident may not be included merely by going back a predetermined period of time. Meanwhile, saving a video purposelessly for long period of time might burden the storage area of a memory card, etc. wastefully.

SUMMARY OF THE INVENTION

A recording control apparatus according to an embodiment of the present invention includes: a video acquisition unit that acquires video data capturing a scene around a vehicle; a recording control unit that is adapted to record the video data in a predetermined area and define that at least a portion of the video data should be saved; and an event detection unit that detects occurrence of a predefined event. The event detection unit detects that an event occurs, when a save-triggering event, which is defined to trigger saving of the video data, occurs or when an event not triggering saving, which is different from the save-triggering event and for which it is defined that a point of time of detection thereof should be recorded, occurs, and the recording control unit records, when the event detection unit detects the event not triggering saving, the point of time of detection of the event not triggering saving, and defines, when the event detection unit detects the save-triggering event within a standby period defined in association with the event not triggering saving after detection of the event not triggering saving, that video data including a video at the point of time of detection of the event not triggering saving and a video at a point of time of detection of the save-triggering event should be saved.

Another embodiment of the present invention relates to a recording control method. The method includes: acquiring video data capturing a scene around a vehicle; recording the video data in a predetermined area; when occurrence of a save-triggering event predefined to trigger saving of the video data is detected, defining that video data including a point of time of detection of the save-triggering event should be saved; and defining, when occurrence of an event not triggering saving, which is different from the save-triggering event and for which it is defined that a point of time of detection thereof should be recorded, is detected as an event and when the save-triggering event is detected within a standby period defined in association with the event not triggering saving after detection of the event not triggering saving, that video data including the point of time of detection of the event not triggering saving and the point of time of detection of the save-triggering event should be saved.

Optional combinations of the aforementioned constituting elements, and mutual substitution of constituting elements and implementations of the present invention between methods, apparatuses, systems, programs, etc. may also be practiced as additional modes of the present invention.

DETAILED DESCRIPTION

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration. In the following embodiments, a drive recorder is mainly described as exemplifying the recording control apparatus.

Embodiment 1

Figure 1:
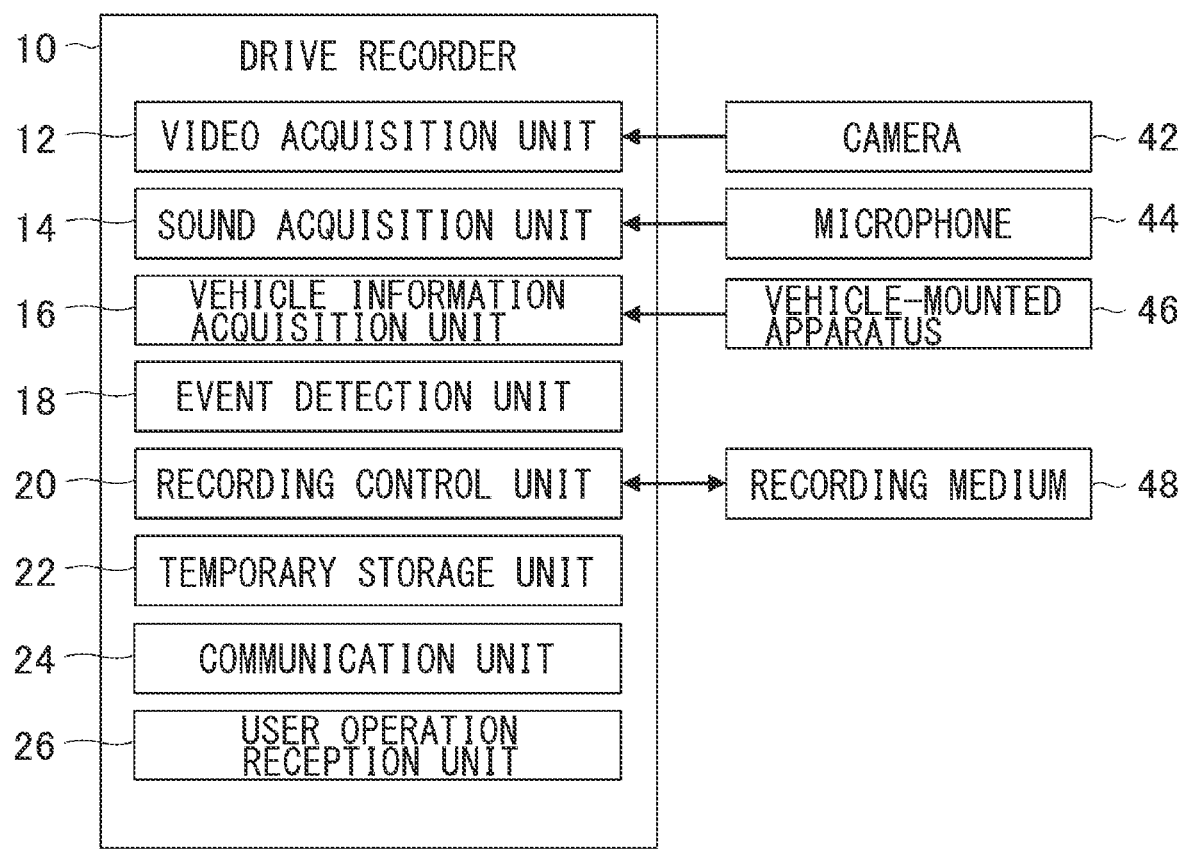
FIG. 1 is a block diagram schematically showing functional features of a drive recorder.

FIG. 1 is a block diagram schematically showing functional features of a drive recorder 10. The functional blocks depicted are implemented in hardware such as devices or mechanical components such as a CPU or a memory of a computer, and in software such as a computer program. FIG.

1 depicts functional blocks implemented by the cooperation of these elements. Therefore, it will be understood by those skilled in the art that these functional blocks may be implemented in a variety of manners by a combination of hardware and software.

The drive recorder 10 includes a video acquisition unit 12, a sound acquisition unit 14, a vehicle information acquisition unit 16, an event detection unit 18, a recording control unit 20, a temporary storage unit 22, a communication unit 24, and a user operation reception unit 26. The video acquisition unit 12 may be configured as a part of the vehicle information acquisition unit 16, or the video acquisition unit 12 may be included in the vehicle information acquisition unit 16. The drive recorder 10 is mounted on a vehicle. The communication unit 24 exchanges information with an external device by communicating therewith by wireless connection. The user operation reception unit 26 receives a user operation input from a user. The drive recorder 10 may further include a monitor unit that displays a video taken and a speaker unit that outputs recorded sound.

The video acquisition unit 12 acquires video data taken by a camera 42 provided in the vehicle. The camera 42 is configured to image a scene around the vehicle. For example, the camera 42 is configured to image a scene in front of the vehicle. The camera 42 may be configured to image only a scene outside the vehicle or image scenes both outside and inside the vehicle. A plurality of cameras may be mounted in a vehicle. For example, the plurality of cameras may image scenes in front of, behind, to the side of, and inside the vehicle, respectively. To implement the feature for imaging scenes both outside and inside the vehicle, the camera 42 may be configured as a full-circumference camera capable of capturing a scene 360° around or a plurality of cameras capturing scenes in front and behind. The camera 42 may be built in the drive recorder 10 or separate from the drive recorder 10. The video acquisition unit 12 may acquire, as vehicle information related to the driving of the vehicle, an image taken by the camera 42. The video acquisition unit 12 may be regarded as a part of the vehicle information acquisition unit 16.

The sound acquisition unit 14 acquires sound data acquired by a microphone 44 provided in the vehicle. The microphone 44 is configured to collect sound from inside and outside the vehicle. The microphone 44 may be built in the drive recorder 10, separate from the drive recorder 10, or integrated with the camera 42. The sound acquisition unit 14 may acquire, as vehicle information related to the driving of the vehicle, sound by using the microphone 44. The sound acquisition unit 14 may be regarded as a part of the vehicle information acquisition unit 16.

The vehicle information acquisition unit 16 acquires vehicle information related to the driving of the vehicle from a vehicle-mounted apparatus 46 provided in the vehicle. Specific examples of the vehicle-mounted apparatus 46 include, but are not limited to, a vehicle speed sensor, steering angle sensor, accelerator position sensor, brake position sensor, acceleration sensor, gyro sensor, radar sensor, Light Detection and Ranging (LiDAR), position information sensor (e.g., GNSS; Global Navigation Satellite System), passenger seat sensor, etc. The vehicle information acquisition unit 16 may acquire vehicle information via various electronic control units (ECU) or may acquire vehicle information via a navigation apparatus. The vehicle information acquisition unit 16 may acquire information detected various sensors such as an acceleration sensor, gyro sensor, and position information sensor built in the terminal of a user such as a cell phone. The vehicle information acquisition unit 16 may acquire information related to the driving of the vehicle from a sensor built in the drive recorder 10. For example, sensors like an acceleration sensor, a position information sensor, etc. may be built in the drive recorder 10. The camera 42 or the microphone 44 may be regarded as one of vehicle-mounted apparatuses, and the vehicle information acquisition unit 16 may be configured to include the video acquisition unit 12 or the sound acquisition unit 14.

The vehicle information acquisition unit 16 acquires information related to the condition of the vehicle, information related to the manipulation of the vehicle, information related to the speed of the vehicle, information related to the position of the vehicle, information related to an obstacle around the vehicle, information related to the operating condition of the driving assistance function of the vehicle etc. from the vehicle-mounted apparatus 46. The vehicle information acquisition unit 16 may acquire, as information related to the condition of the vehicle, information indicating whether the door or the window is open or closed. The vehicle information acquisition unit 16 may acquire, as information related to the manipulation of the vehicle, information indicating whether a user manipulation to request the door or the window to be opened or closed. The vehicle information acquisition unit 16 may acquire, as information related to an obstacle around the vehicle, information indicating whether a further vehicle is located within a certain range around the vehicle or whether a pedestrian, a bicycle, an obstacle such as a fallen object or a building is located on the traffic lane on which the vehicle is traveling. The vehicle information acquisition unit 16 may acquire information indicating whether a passenger is in the vehicle. The vehicle information acquisition unit 16 may acquire, as information related to the operating condition of the driving assistance function of the vehicle, information related to on/off of the automatic driving function or remote control function or information related to whether a particular driving assistance function is in operation. The driving assistance function is exemplified by, but is not limited to, adaptive cruise control (ACC) or lane keeping assistance system (LKAS).

The event detection unit 18 detects occurrence of various predefined events, based on video data acquired by the video acquisition unit 12, sound data acquired by the sound acquisition unit 14, and vehicle information acquired by the vehicle information acquisition unit 16. A trigger event and a marking event are predefined as events that the event detection unit 18 is capable of detecting.

A serious incident such as a vehicle accident or trouble is assumed as a trigger event. A trigger event is a save-triggering event that triggers saving of video data as overwrite-disabled data in the event of its occurrence or detection. The event detection unit 18 detects, as a trigger event, occurrence of an accident such as collision, contact, overturn, and fall of a vehicle or of a trouble such as rude conduct and dangerous driving by the driver of a vehicle around. The event detection unit 18 may refer to video data acquired by the camera 42 or sound data acquired by the microphone 44 to detect occurrence of an accident or a trouble by image recognition or sound recognition based on a predetermined recognition pattern. The event detection unit 18 may refer to information such as traveling speed and acceleration of the vehicle and information related to manipulation of accelerator, brake, steering, etc. to detect the occurrence of a trigger event by recognizing an abrupt change in vehicle behavior caused by a sudden start, sudden stop, and sudden swinging. The event detection unit 18 may detect the occurrence of a trigger event by recognizing an abrupt change in vehicle behavior based on a predetermined threshold value or a predetermined recognition pattern for recognizing a condition in which the likelihood of an accident or a trouble is high. The event detection unit 18 may refer to video data of the camera 42, information from a radar sensor of the vehicle, etc. to detect the occurrence of a trigger event by recognizing approach to the vehicle in front, approach to an object around the vehicle, deviation from a lane being traveled, etc., based on a predetermined recognition pattern. The event detection unit 18 may also detect the occurrence of a trigger event when the user operation reception unit 26 receives pressing of a save start button provided in the drive recorder 10 or an audio command designating start of saving.

A marking event is an event not triggering saving that could have certain ex-post relevance to a serious incident such as an accident and a trouble that may occur subsequent to the marking event. A marking event does not trigger saving on its own but is an event for which it is defined that the timing of detection thereof should be recorded. Individual standby periods are defined for respective types of the marking event. The standby periods defined for each marking event include a variable first standby period adjusted to suit the overall capacity or available capacity of a recording medium 48 and a fixed second standby period defined separately from the first standby period. The first standby period is a variable period for which the upper limit is the duration of the second standby period. Details of the standby period will be described later. A marking event is an event that can be said to be normally irrelevant to an accident or a trouble. When an accident or a trouble occurs within the standby period, it is found ex-post that the marking event might have had certain relevance to such an event. For this reason, video data is not saved immediately upon detection of a marking event, but the point of time of detection of the marking event is recorded. When a trigger event occurs within a predetermined standby period, the marking event is saved ex-post by going back in time. Therefore, the point of time of detection of a marking event is recorded as a candidate of start of video data saved ex-post by going back in time. A marking event encompasses a minor event that seems irrelevant to an accident or a trouble at first sight. For example, a marking event may be an event such as abnormal noise, opening or closing of a door or a window, flickering of light, change in a passenger, driver's action other than steering, up and down movement of a vehicle, behavior of a vehicle around, and weather change.

"Abnormal noise" as a marking event is sound inside and outside the vehicle acquired by the microphone 44 and recognized based on a predetermined recognition pattern. For example, "abnormal noise" may be sound exceeding a predetermined sound level, sound for which a rate of increase of sound volume exceeds a predetermined value, sound within a predetermined frequency range, or sound of a cell phone. "Opening or closing of a door or a window" as a marking event is detected based on information that the vehicle information acquisition unit 16 acquires from the vehicle-mounted apparatus 46 as indicating the open or closed condition of a door or a window or information indicating that a user operation requesting opening or closing of a door or a window is provided. "Flickering of light" as a marking event is detected from, for example, image data, based on a predetermined recognition pattern. "Change in a passenger" as a marking event is a large change in the line of sight or posture of the driver or a passenger and is detected from the image data, based on a predetermined recognition pattern. For example, change in the line of sight is a change in which the driver or a passenger witnesses an accident or sudden pedestrian crossing occurring outside the vehicle and suddenly moves the line of sight in the direction of occurrence. Change in posture is an action different from an ordinary driving action such as an action of picking up an article dropped on the floor. "Driver's action other than steering" as a marking event may be a driving action other than steering such as manipulation of a direction indicator, a shift lever, and a hand brake or may be an action other than a driving action such as manipulation of an apparatus such as a navigation apparatus, audio apparatus, and cell phone, These actions may be detected by referring to information acquired from the vehicle-mounted apparatus 46 and related to an action to control the vehicle or may be detected from the video data capturing the interior of the vehicle, based on a predetermined recognition pattern. "Up and down movement of a vehicle" may be up and down movement caused by a step encountered when the vehicle enters or leaves a parking lot and may be detected based on vehicle information from an acceleration sensor or from image data, based on a predetermined threshold value or recognition pattern. When an up and down movement caused by a step is detected from vehicle information from an acceleration sensor, the movement is detected according to a predetermined threshold value lower than the threshold value used for detection of collision of a vehicle. "Behavior of a vehicle around" as a marking event is a behavior of another vehicle around the driver's vehicle overtaking or passing by the driver's vehicle at an extremely high speed that exceeds a predetermined speed and may be detected from the image data based on a predetermined recognition pattern. "Weather change" as a marking event is, for example, an abrupt change to rough weather such as heavy rain and snow and may be detected from the image data based on a predetermined recognition pattern.

When a marking event detected is an event that lasts a relatively short period of time, the point of time when the marking event was first detected may be defined as the "point of time of detection". When the condition of detection of a marking event continues for a predetermined period of time or longer, the end of the period during which the marking event is detected may be defined as the "point of time of detection". When similar marking events occur successively at a time interval within a predetermined range, those successive similar marking events may be recorded as a single marking event. In that case, the point of time when the last event of the successive marking events ends may be defined as the "point of time of detection".

The recording control unit 20 records the video data taken by the camera 42 on a continuous basis and acquired by the video acquisition unit 12, the sound data collected by the microphone 44 on a continuous basis and acquired by the sound acquisition unit 14, and the vehicle information acquired by the vehicle information acquisition unit 16 in a predetermined area. The "predetermined area" is the temporary storage unit 22 and the recording medium 48. First, the recording control unit 20 temporarily stores the video data, sound data, vehicle information in the temporary storage unit 22. The recording control unit 20 records the video data and sound data stored in the temporary storage unit 22 in the recording medium 48 using the ring buffer scheme.

The temporary storage unit 22 may be a buffer memory comprised of a non-volatile memory such as a flash memory and a solid state drive (SSD) or a volatile memory such as DRAM. The recording medium 48 is a memory card such as an SD card (registered trademark) and is used by being inserted into a slot provided in the drive recorder 10 and configured to be removable from the drive recorder 10. The recording medium 48 may be comprised of an auxiliary storage device such as a solid state drive and a hard disk drive. The sound data stored in the temporary storage unit 22 and the sound data recorded in the recording medium 48 are stored or recorded in a format of moving image data synthesized with the video data. However, moving image data may be stored or recorded as soundless video data that does not contain sound data, depending on the mode selected by the user. Therefore, the "video data" as contemplated in the following description may or not may not contain sound data, although an explanation is omitted.

The video data stored in the temporary storage unit 22 may be stored as moving image data in a streaming format such as MPEG2-TS segmented at predetermined time intervals. The video data recorded in the recording medium 48 may have the same format as the video data stored in the temporary storage unit 22 or a different format such as an MP4 format having a higher compression rate.

The recording control unit 20 records video data in the temporary storage unit 22 and the recording medium 48 using the ring buffer scheme. When the data recorded in the temporary storage unit 22 and the recording medium 48 fills the capacity, therefore, the oldest data is overwritten. The recording control unit 20 temporarily records video data in the temporary storage unit 22 and the recording medium 48, assigning an overwrite-enabled attribute to the video data. When a marking event is detected by the event detection unit 18, the recording control unit 20 records the point of time of detection of the marking event in the recording medium 48. The point of time of detection may also be recorded by being assigned the overwrite-enabled attribute. The point of time of detection may be recorded by recording information on the date and time indicating the point of time of detection or information on the temporal position in the video data. The recording control unit 20 may record vehicle information such as vehicle speed or vehicle position acquired from a vehicle speed sensor or a position information sensor at the point of time of detection, as well as the information indicating the point of time of detection itself.

When the event detection unit 18 detects a trigger event, the recording control unit 20 sets an overwrite disabled save format in, of the video data recorded in the recording medium 48, the video data in a time period at least including the point of time of detection of the trigger event. By setting an overwrite-disabled save format, the recording control unit 20 disables overwriting of at least a portion of the video data. An overwrite-enabled or overwrite-disabled attribute may be set by, for example, writing the attribute in a predetermined flag, etc. included in the video data. Alternatively, the attribute may be set by writing an overwrite-enabled or disabled attribute in a management file such as an index independent of the video data. When an overwrite enabled or disabled attribute is written in the original video data itself, information, indicating a start position and an end position of period in the original video data saved with an overwrite-disabled option, may be written. In this case, the portion other than the saved portion, i.e., the overwrite-enabled portion is subsequently overwritten by further data such that the saved portion is consequently clipped from the start position to the end position so as to remain. Alternatively, distinction between overwrite-enabled and overwrite-disabled may be made by separately saving the saved portion in the form of an independent file created by clipping it from the original video data. When the portion clipped as the saved portion extends across multiple items of video data, a file concatenating portions clipped from the respective items of video data may be saved. When the saved portion is separately saved in the form of an independent file, distinction between overwrite-enabled an overwrite-disabled may be made by recording it in a special area (e.g., in a special folder) different from the area in which the overwrite-enabled data is recorded. The data for which an overwrite-disabled attribute is set maintains a condition of overwrite-disabled until the data is deleted or changed to an overwrite-enabled attribute by an explicit user operation.

There are three methods whereby the recording control unit 20 determines a portion of the video data recorded in the recording medium 48 saved with an overwrite-disabled attribute. A main feature of this embodiment is that video data is saved according to the second or third determination method in addition to the first determination method representing the related-art procedure.

The first determination method is a determination method that defines, when a trigger event is detected, that video data for a predetermined period of time including the point of time of detection should be saved. In this case, the recording control unit 20 defines that video data from a point of time going back a predetermined period of time (e.g., 5 seconds) from the point of time of detection of the trigger event to a point of time when a predetermined period of time (e.g. 10 seconds) has elapsed since the point of time of detection of the trigger event should be saved. The 15-second period before and after the point of time of detection of the trigger event that should be saved is a fixed period of time. In other words, the first determination method is a method that defines a point of time going back a predetermined period of time as the point of time to start saving, regardless of whether a scene of a serious incident such as an accident or a trouble or a cause thereof is actually included in the video saved. In this case, an event that causes an accident or a trouble may not be included in the video saved. Meanwhile, saving a video purposelessly for a long period of time may likely burden the storage area of a memory card, etc. wastefully.

The second determination method is a determination method executed when a trigger event is detected within a first standby period since the detection of a marking event, the first standby time being defined in association with the marking event. When the event detection unit 18 detects a marking event, the recording control unit 20 records the point of time of detection of the marking event in a predetermined area. "Predetermined area" may be, for example, the recording medium 48. The first standby period is a period for which the occurrence of a trigger event is waited for in order to identify ex-post, in the case a trigger event occurs after the marking event, the occurrence of the marking event as the point of start of the video capturing an accident or a trouble. Basically, the recording control unit 20 sets, as the first standby period, the same period of time as the second standby period described later. Under a certain condition, however, a period of time shorter than the second standby period is set. For example, a period of time shorter than the second standby period is set when the recording control unit 20 detects that the maximum capacity of the recording medium 48 is smaller than a predetermined value according to the specification of the memory card, or when the recording control unit 20 detects that the remaining capacity of the memory card that is overwrite-enabled is smaller than a predetermined value. In one variation, a period of time shorter than the second standby period may equally be set when the recording control unit 20 detects that the maximum number of files, the maximum file size, etc. according to the specification is smaller than predetermined values. When a trigger event is detected within the first standby period from the point of time of detection of the marking event, the recording control unit 20 defines that continuous video data for a period of time that includes both the point of time of detection of the marking event and the point of time of detection of the trigger event should be saved. The recording control unit 20 may record marking information indicating the point of time of detection of the marking event in a portion of the video data recorded in the recording medium 48 with an overwrite-enabled attribute or may record marking information as separate data associated with the video data. In one variation, "predetermined area" in which the marking event is recorded may be the temporary storage unit 22. In other words, the recording control unit 20 may store the point of time of detection of the marking event in the temporary storage unit 22 instead of recording it in the recording medium 48.

According to the second determination method, the period of time tracked back to find a point of start of the video data that should be saved can be a variable period instead of a fixed period. Further, the period of time tracked back to find a point of start of the video data that should be saved can be extended in accordance with the actual duration of the period from the marking event to the trigger event so as to avoid saving video for a long period of time purposelessly. Further, depletion of the available capacity of the memory card is avoided by setting the first standby period to have the most appropriate duration to suit the overall capacity of the memory card or the situation of the available capacity. The upper limit (longest duration) of the first standby period may be equal to the second standby period. Meanwhile, the lower limit value may be set to individual time values for the respective marking events. Alternatively, the specification may be such that, by setting the lower limit value to be 0 seconds, the step of going back in time to find saved portion according to the second determination method is virtually skipped in a situation in which the memory card is running out of available capacity. In one variation, the size of video data may be reduced relatively by setting the frame rate for a period going back from the trigger event to the marking event to be lower than the frame rate before and after the trigger event.

The third determination method is a determination method executed when a trigger event is detected within the second standby period after the detection of a marking event, the second standby period being associated with the marking event. The second standby period is a fixed period corresponding to the upper limit value of the first standby period, which is a variable period. When the first standby period is shortened depending on the situation, the second standby period will be longer than the first standby period consequently. Given this, the third determination method could be executed when the first standby period is shortened and when a trigger event is not detected within the first standby period. The second standby period is a period of time in which the occurrence of a trigger event is waited for to define ex-post that a video should be saved, on an assumption that, even if a trigger event does not occur within the first standby period, the video may have relevance to an accident or a trouble if a trigger event occurs after the first stand by period. The second standby period is the longest period of time assumed as the period of time in which the occurrence of a trigger event is waited for. The recording control unit 20 defines that the video data including a video at a point of time of detection of a marking event and the video data including a video at a point of time of detection of a trigger event should be saved, associating the items of data with each other. In other words, unlike the second determination method of going back in time to the point of time of detection of the marking event to save one continuous item of video data, the third determination method saves the videos at the respective points of time of detection separately. The recording control unit 20 may associate the plurality of items of video data with each other by assigning the same identification information to the video data or mutually linking the file names to the respective video data. When the remaining capacity of the memory card is sufficient, the first standby period is not shortened, with the result data may be saved over a period of time corresponding to the second standby period or longer. The second and third determination methods are available in embodiment 1 so that the data that should be saved is defined according to the first determination method only when a trigger event is detected before a marking event is detected or when a trigger event is detected after an elapse of the second standby period since the detection of a marking event.

The third determination method makes it possible to define ex-post that a video of an event that may have certain relevance to an accident or a trouble should be saved even when a trigger event occurs after an elapse of a time exceeding the first standby period since the detection of a marking event. It also makes it possible to avoid wastefully saving a video extending over a long period of time and irrelevant to an accident or a trouble that could be located between the marking event and the trigger event. Consequently, it allows ex-post inclusion, in the data that should be saved, of a video of an extensive range of minor events for which it is not clear whether the event is relevant to an accident or a trouble at the time of detection. It also allows efficiently saving of an extensive range of events that should be saved, without burdening the memory card.

Figure 2A:
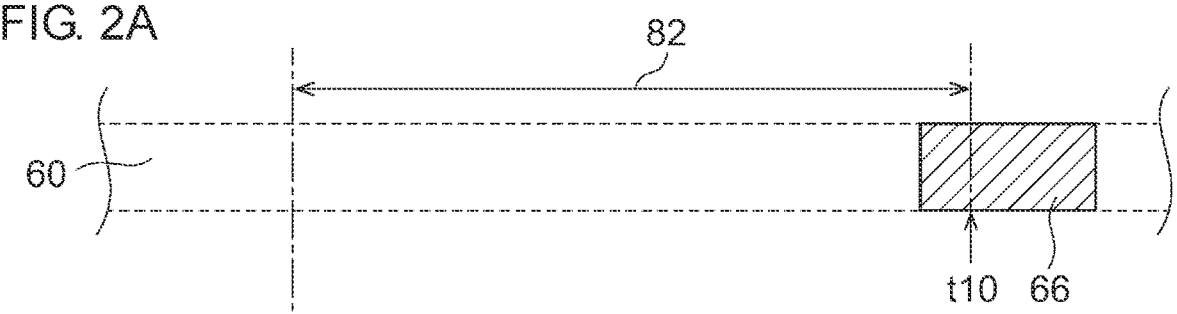
FIGS. 2A-2D are time charts showing steps in the first through third determination methods.

FIGS. 2A-2D are time charts showing steps in the first through third determination methods. FIG. 2A shows a step whereby a portion of band-shaped first video data 60 depicted in broken lines is saved according to the first determination method. In this example, the recording control unit 20 defines that the video data extending over a first save period 66 should be saved in response to the detection of a trigger event such as an accident at a point of time t10. The first determination method is executed on the condition that a marking event does not occur in a period of time going back at least a second standby period 82 from t10. Stated otherwise, the first determination method is executed on the condition that the trigger event is detected after an elapse of the standby periods for all previously detected marking events (i.e., the longest of the standby periods defined for the respective marking events). The recording control unit 20 defines that the video data for the first save period 66, i.e., the 15-second video data between t10−5 seconds and t10+10 seconds, should be saved.

Figure 2B:
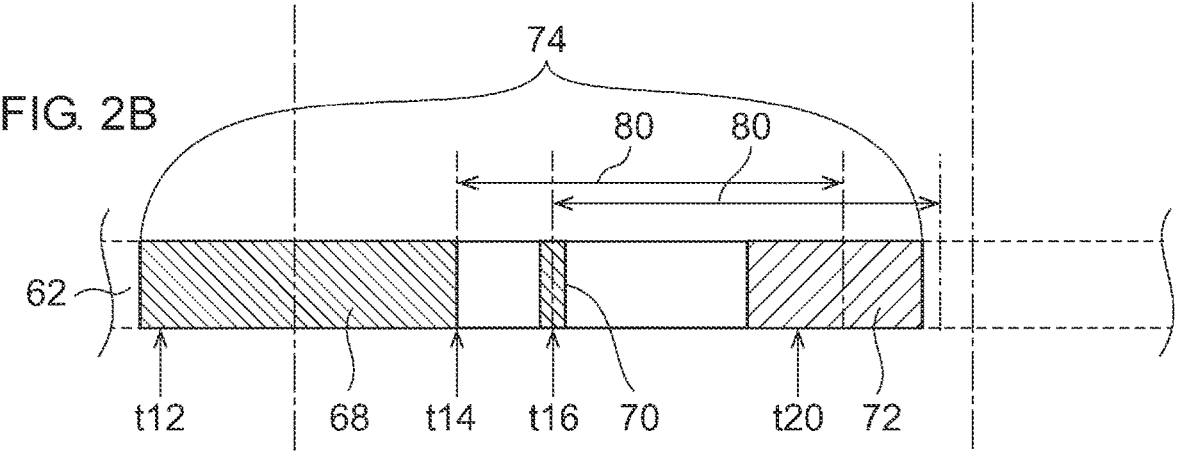

FIG. 2B shows a step whereby a portion of band-shaped second video data 62 depicted in broken lines is saved according to the second determination method. A first marking event 68 is an event of a type in which a predetermined period of time (e.g., 3 seconds) lasts for detection thereof or an event of a type detected continuously at an interval less than a predetermined period (e.g., 2 seconds). A period from a point of time preceding t12 by a short period of time to a point of time of t14 is regarded as a single event. The recording control unit 20 records t14, when the first marking event 68 ends, as the point of time of detection of the first marking event 68 in the recording medium 48. In one variation, however, t12, when the first marking event is detected, may be recorded in the recording medium 48. The recording control unit 20 defines that video data should be saved in response to the detection of a trigger event such as an accident at t20, which is included in a period during which a first standby period 80 (e.g., 30 seconds) elapses since the point of time t14. In this case, the recording control unit 20 defines that data going back by a predetermined period of time (e.g., 1 second) from t12, when the first marking event 68 is detected, should be saved instead of only defining the 15-second video portion (illustrated as "virtual save period 72") between t20−5 seconds and t20+10 seconds should be saved. In other words, it is defined that the video portion of a second save period 74 between t12−1 second to t20+10 seconds should be saved in the form of one continuous item of video data.

A description will now be given of a case in which another, second marking event 70 is detected since the detection of the first marking event 68 until the detection of a trigger event. The second marking event 70 is, for example, an event such as manipulation of the direction indicator that is completed instantaneously, i.e., an event of a type for which detection thereof does not last for a predetermined period of time (e.g., 3 seconds) or longer. The recording control unit 20 records t16, when the second marking event 70 is detected, as the point of time of detection of the second marking event 70 in the recording medium 48. In the example of FIG. 2B, the recording control unit 20 defines the video portion for the second save period 74, including the video portion of the second marking event 70, in the form of one continuous item of video data. It should be noted that, even if the first marking event 68 is not detected, the recording control unit 20 would define that the video data going back 1 second from t16 should be saved, in response to the detection of a trigger event at t20 until the first standby period 80 elapses since t16. In this case, the recording control unit 20 defines that a period between t16−1 second and t20+10 seconds should be saved in the form of one continuous item of video data.

Figure 2C:
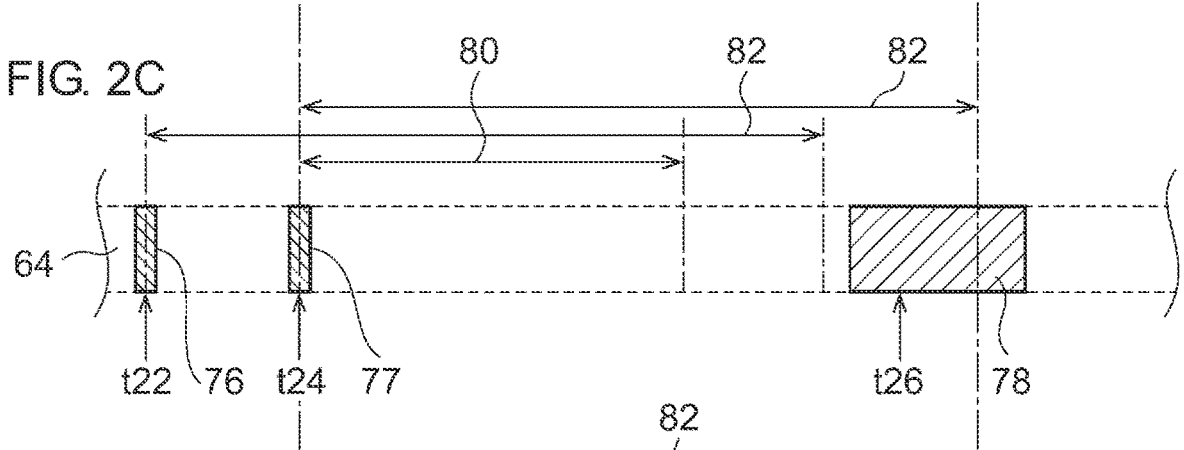

FIG. 2C shows a step whereby a portion of band-shaped third video data 64 depicted in broken lines is saved according to the third determination method. The fourth marking event 77 is an event of a type for which detection thereof does not last for a predetermined period of time (e.g., 3 seconds) or longer. The recording control unit 20 records t24, when the fourth marking event 77 is detected, as the point of time of detection of the fourth marking event 77 in the recording medium 48. A trigger event such as an accident is not detected before the first standby period 80 elapses since the point of time t24 so that the second determination method is not executed. Meanwhile, the third detection method is executed in response to the detection of a trigger event such as an accident at t26, which is included in a period in which the second standby period 82 elapses since the point of time t24. It is defined that the video data including t24 and the video data including t26 should be saved such that they are associated with each other. In this case, it is defined that the video data for 2 seconds between t24−1 second and t24+1 second should be saved as video data for the fourth marking event 77, and it is defined that the video data for 15 seconds between t26−5 seconds and t26+10 seconds should be saved as video data for the third save period 78. Information that associates the video data with each other may be written in the video data or written in a management file separate from the video data.

Meanwhile, a third marking event 76 is detected at t22 that precedes t24, and the point of time of detection thereof is recorded in the recording medium 48. However, t26 is not included or a trigger event such as another accident is not detected in a period in which the second standby period 82 elapses since the point of time t22. Therefore, the third marking event 76 is not associated with the trigger event at t26, and it is not defined that the video data for the third marking event 76 should be saved.

Figure 2D:
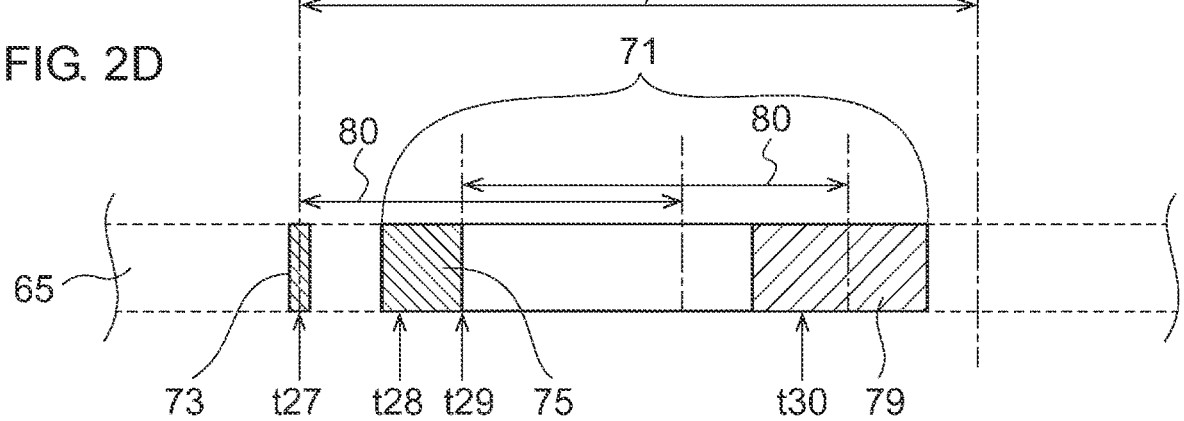

FIG. 2D shows a step whereby a portion of band-shaped fourth video data 65 depicted in broken lines is saved according to a combination of the second and third determination methods. A sixth marking event 75 is, like the first marking event 68 of (b), is an event of a type in which detection thereof lasts for a predetermined period of time or longer or an event of a type detected continuously at an interval less than a predetermined period. A period from a point of time slightly preceding t28 to t29 is regarded as a single event. The recording control unit 20 records t29, when the sixth marking event 75 ends, as the point of time of detection of the sixth marking event 75 in the recording medium 48. The recording control unit 20 defines that video data should be saved in response to the detection of a trigger event such as an accident at t30, which is included in a period during which the first standby period 80 (e.g., 30 seconds) elapses since the point of time t29. In this case, the recording control unit 20 defines that the data going back by a predetermined period of time (e.g., 1 second) from t28, when the sixth marking event 75 is detected, should be saved instead of defining that only the 15-second (illustrated as "virtual save period 79") video portion between t30−5 seconds and t30+10 seconds should be saved. In other words, it is defined that the video portion for a fourth save period 71 between t28−1 second to t30+10 seconds should be saved in the form of one continuous item of video data.

Meanwhile, a fifth marking event 73 is also detected before the sixth marking event 75. The recording control unit 20 records t27, when the fifth marking event 73 is detected, as the point of time of detection of the fifth marking event 73 in the recording medium 48. A trigger event is not detected until the first standby period 80 elapses since t27, but a trigger event is detected at t30 during the second standby period 82, in response to which the third detection method is executed. This defines that the video data including t27 should be saved such that it is associated with the video data including t28 and t30. In this case, it is defined that the video data for 2 seconds between t27−1 second and t27+1 second should be saved as video data for the fifth marking event 73.

In the example of FIG. 2D, the sixth marking event 75 is detected (t28) during the first standby period 80 since t27, which is the point of time of detection of the fifth marking event 73. A trigger event is detected during the first standby period 80 from the point of time of detection (t28 or t29). In one variation of FIG. 2D, the specification may require that, when a trigger event is detected after a succession of marking events during the first standby period defined for the respective marking events, one continuous item of video data going back to the first marking event in succession be saved. In other words, when marking events occur in succession without an interval equal to or longer than the standby period, continuous video data for a long period of time going back to the first marking event may be saved. In another variation, the specification may require that a standby time is defined for the trigger event as well. A standby period may be defined for a particular trigger event of a plurality of types of trigger events. Individual standby periods may be defined for respective trigger events. In this case, when the detection of a trigger event is detected and then another trigger event is detected until the standby period defined for the initial trigger event elapses, it is defined that one item of continuous video data including the plurality of trigger events should be saved. In other words, by going back to the previous trigger event in a succession of trigger events during the standby period to save continuous video data, it is ensured that a video of a long period of time for a succession of trigger events is saved. For example, a video can be saved over a long period of time when the user is afflicted by aggressive driving for a distance as long as several km or for a long period of time.

In the examples of FIG. 2, it is described, by way of example, that the first standby period 80 lasts 30 seconds and the second standby period 82 last 60 seconds commonly for the marking events, in order to facilitate the comparison between (a)-(c). Actually, the first standby period 80 is defined to have an individual duration for each marking event, and the second standby period 82 is also defined to have an individual duration for each marking event. Also, an optimum duration is defined for the first standby period 80 to suit the situation of the memory card. In one variation, the first standby period 80 may be a fixed period of time shorter than the second standby period 82, or the second standby period 82 may be a variable period of time.

Figure 3:
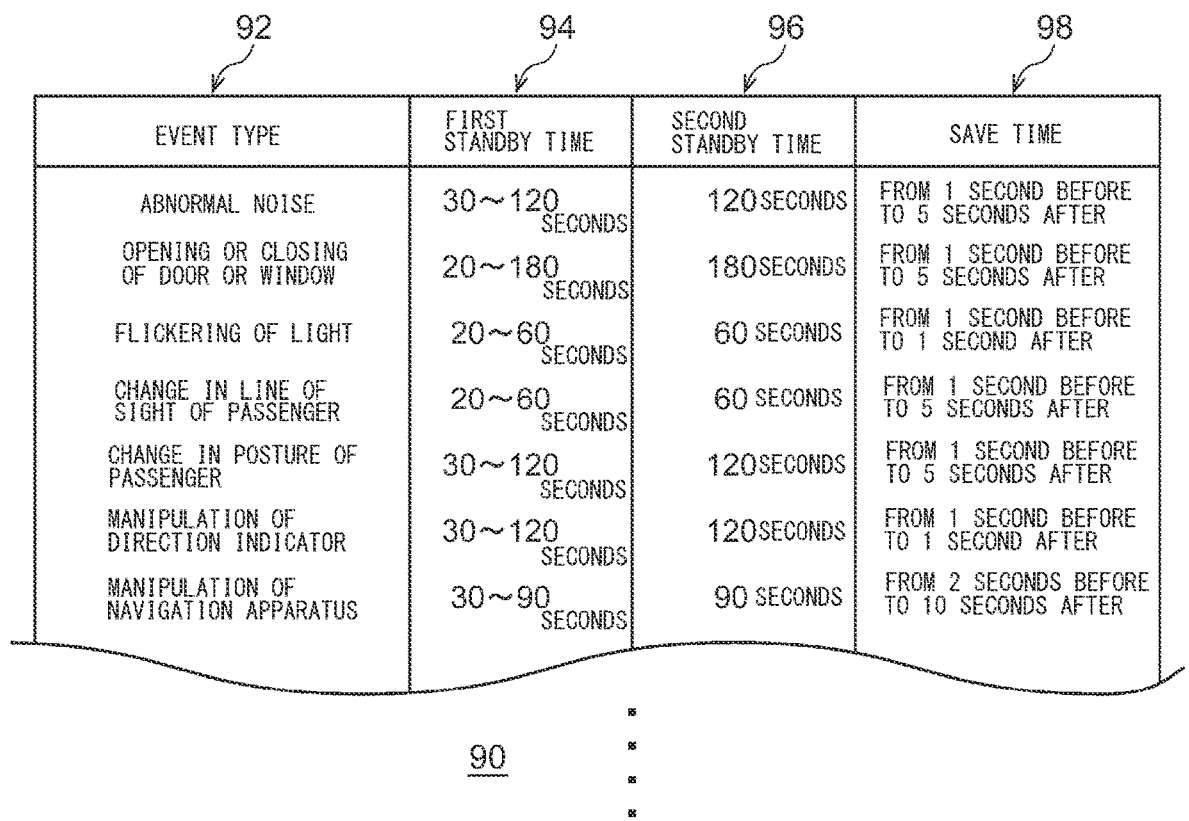
FIG. 3 shows a table showing an exemplary correspondence between standby period and save time for each marking event.

FIG. 3 shows a table showing an exemplary correspondence between standby period and save time for each marking event. The recording control unit 20 refers to a marking event table 90 as illustrated and defines, for each marking event, the first standby period, the second standby period, and save time (duration), the save time being set when it is defined that the marking event should be saved. In an event type field 92 in the marking event table 90, types of marking events such as "abnormal noise", "opening or closing of door or window", "flickering of light", "change in line of sight of passenger", "change in posture of passenger", "manipulation of direction indicator", and "manipulation of navigation apparatus". The first standby period, the second standby period, and the save time are defined for each marking event in the fields for the first standby period 94, the second standby period 96, and the save time 98.

For the event type "abnormal noise", for example, the first standby period is defined to have a lower limit of 30 seconds and an upper limit of 120 seconds, and the second standby period is defined to be 120 seconds. A period of 6 seconds, from 1 second before the point of time of detection of the event to 5 seconds after the point of time of detection of the event, is defined as the save time. For the event type "opening or closing of door or window", the first standby period is defined to be 20-180 seconds, and the second standby period is defined to be 180 seconds. A period of 6 seconds, from 1 second before the point of time of detection of the event to 5 seconds after the point of time of detection of the event, is defined as the save time. For the event type "flickering of light", the first standby period is defined to be 20-60 seconds, and the second standby period is defined to be 60 seconds. A period of 2 seconds, from 1 second before the point of time of detection of the event to 1 second after the point of time of detection of the event, is defined as the save time. For the event type "change in line of sight of passenger", the first standby period is defined to be 20-60 seconds, and the second standby period is defined to be 60 seconds. A period of 6 seconds, from 1 second before the point of time of detection of the event to 5 seconds after the point of time of detection of the event, is defined as the save time. For the event type "change in posture of passenger", the first standby period is defined to be 30-120 seconds, and the second standby period is defined to be 120 seconds. A period of 6 seconds, from 1 second before the point of time of detection of the event to 5 seconds after the point of time of detection of the event, is defined as the save time. For the event type "manipulation of direction indicator", the first standby period is defined to be 30-120 seconds, and the second standby period is defined to be 120 seconds. A period of 2 seconds, from 1 second before the point of time of detection of the event to 1 second after the point of time of detection of the event, is defined as the save time. For the event type "manipulation of navigation apparatus", the first standby period is defined to be 30-90 seconds, and the second standby period is defined to be 90 seconds. A period of 12 seconds, from 2 seconds before the point of time of detection of the event to 10 seconds after the point of time of detection of the event, is defined as the save time.

In the figure, a variable value of the first standby period, for which the lower limit and the upper limit are defined, is illustrated by way of example, and the upper limit having a value equal to the second standby period is illustrated by way of example. In a variation, the lower limit may be 0 second, and the upper limit may be shorter than the second standby period. Alternatively, the first standby period may have a fixed value. Further, the second standby period may have a variable value defined in accordance with the situation of the available capacity of the memory card. A period of time longer than the second standby period is not defined as the first standby period even if the second standby period is defined to be variable.

Figure 4:
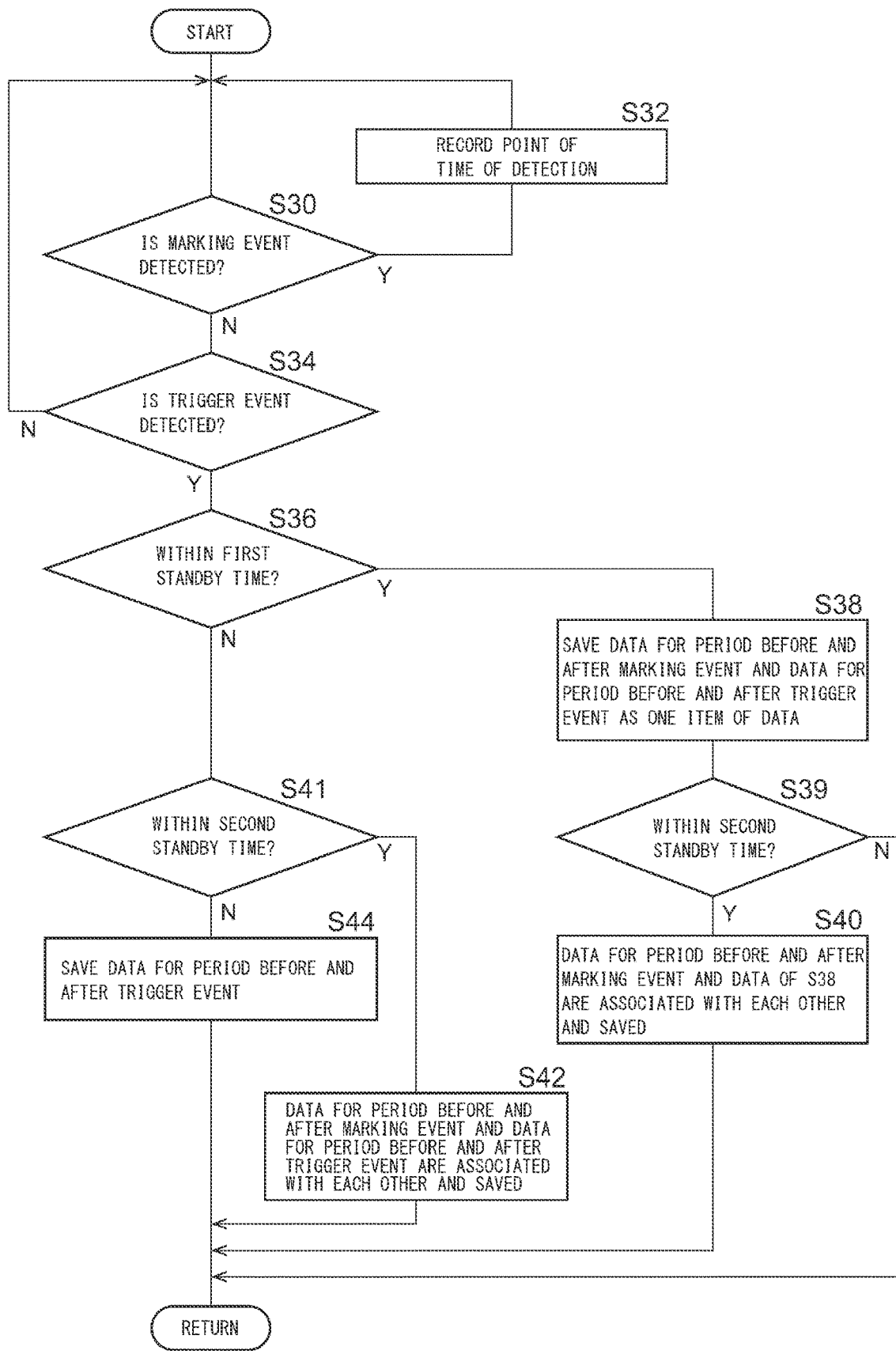
FIG. 4 is a flowchart showing a step of saving a video according to embodiment 1.

FIG. 4 is a flowchart showing a step of saving a video according to embodiment 1. First, when a new marking event is detected (Y in S30), the recording control unit 20 records a point of time of detection thereof in the recording medium 48 (S32). When a new marking event is not detected (N in S30), and when a new trigger event is not detected, either (N in S34), control returns to the start of the flow, and the point of time of detection of a marking event is recorded every time it is detected (Y in S30, S32). When a new trigger event is detected (Y in S34), and when the point of time of detection thereof is within the first standby period from the point of time of detection of the marking event (Y in S36), it is defined that the data for a period before and after the marking event and the data for a period before and after the trigger event should be saved in the form of one continuous item of video data (S38). When there are a plurality of marking events for which the detection of a trigger event occurs within the first standby period, it is defined that the data for the plurality of marking events should be saved in the form of one item of video data. Meanwhile, when there is a marking event for which the detection of a trigger event occurs within the second standby period beyond the first standby period (Y in S39), the video data for a period before or after the marking event and the video data of S38 are associated with each other and saved (S40). The combination of S38 and S40 is a combination of the second and third determination methods shown in FIG. 20D. When there are no marking events for which the detection of a trigger event occurs within the second standby period (N in S39), S40 is skipped. This represents the second determination method. When the point of time of detection of a new trigger event is not within the first standby period from the point of time of detection of the marking event in S36 (N in S36) but within the second standby period (Y in S41), it is defined that the video data for a period before and after the marking event and the video data for a period before and after the trigger event should be associated with each other and saved (S42). This represents the third determination method. When the point of time of detection of a new trigger event is not within the second standby period, either (N in S41), it is defined that the video data only for a period before and after the trigger event should be saved (S44). This represents the first determination method.

Embodiment 2

This embodiment differs from embodiment 1, in which two standby periods including the first standby period and the second standby period are defined for each marking event, in that one standby period is defined for each marking event. Hereinafter, the difference from embodiment 1 will be highlighted, and a description of the common features will be omitted.

Figure 5:
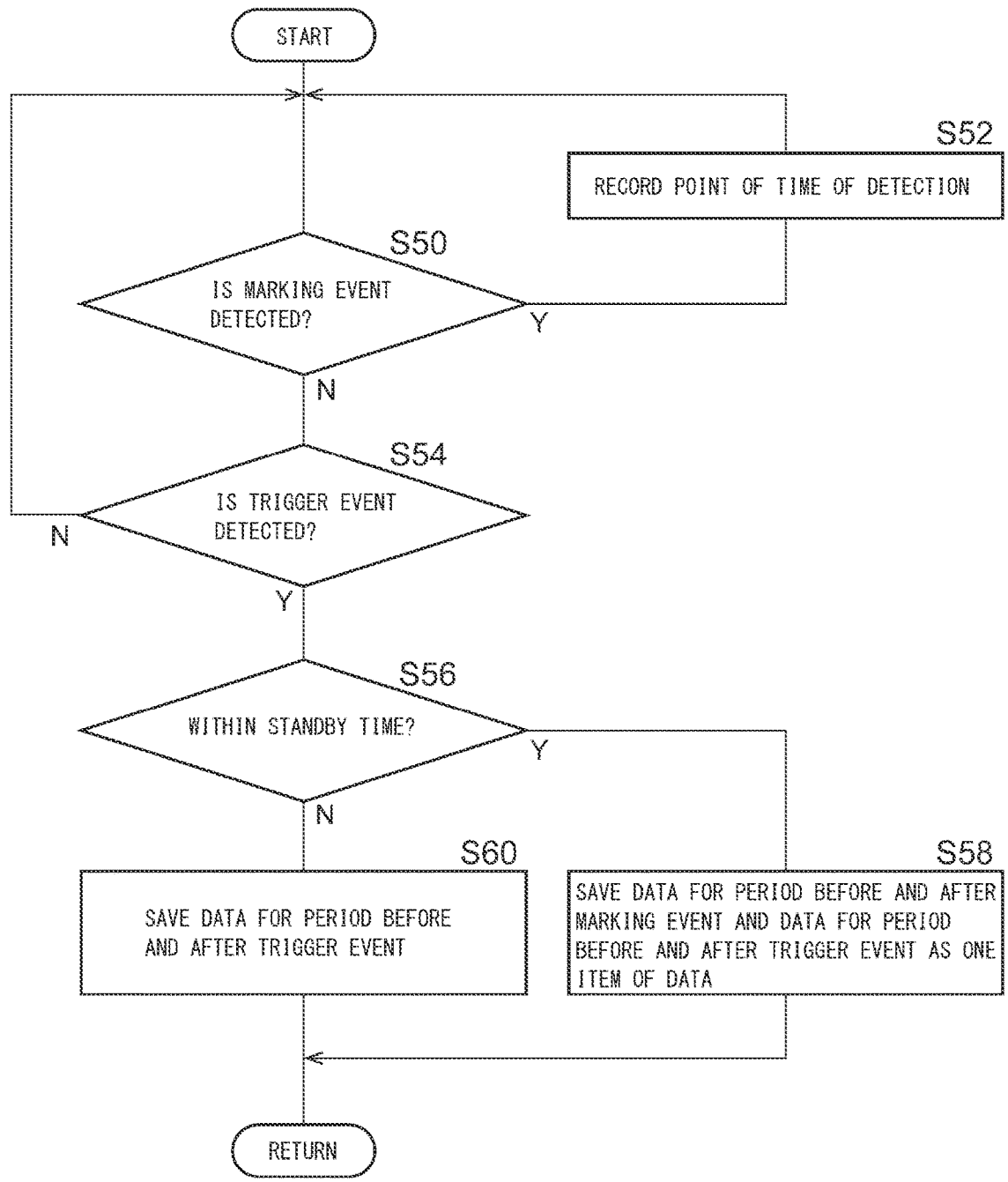
FIG. 5 is a flowchart showing a step of saving a video according to embodiment 2.

FIG. 5 is a flowchart showing a step of saving a video according to embodiment 2. First, when a new marking event is detected (Y in S50), the recording control unit 20 records a point of time of detection thereof in the recording medium 48 (S52). When a new marking event is not detected (N in S50), and when a new trigger event is not detected, either (N in S54), control returns to the start of the flow, and the point of time of detection of a marking event is recorded every time it is detected (Y in S50, S52). When a new trigger event is detected (Y in S54), and when the point of time of detection thereof is within the standby period from the point of time of detection of the marking event (Y in S56), it is defined that the data for a period before and after the marking event and the data for a period before and after the trigger event should be saved in the form of one continuous item of video data (S58). This represents the second determination method. When the point of time of detection of a new trigger event is not within the standby period from the point of time of detection of the marking event (N in S56), it is defined that the video data only for a period before and after the trigger event should be saved (S60). This represents the first determination method. In this embodiment, the third determination method is not employed.

Embodiment 3

This embodiment is similar to embodiment 2 in that one standby period is defined for each marking event but differs from embodiment 2 in terms of the determination method executed when a trigger event is detected after an elapse of the standby period. This embodiment also differs from embodiment 1 in which two standby periods including the first standby period and the second standby period are defined for each marking event. Hereinafter, the difference from embodiments 1, 2 will be highlighted, and a description of the common features will be omitted.

Figure 6:
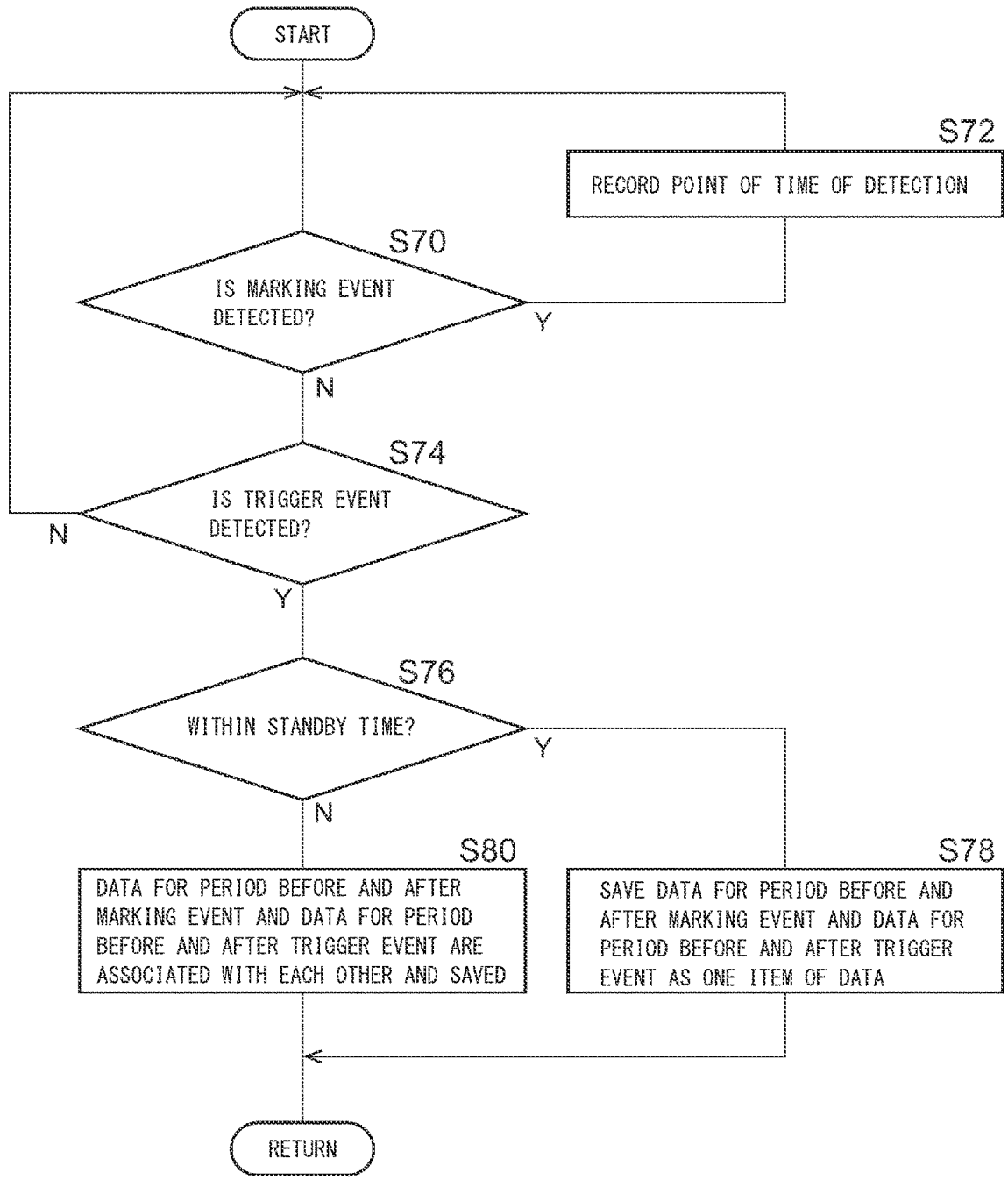
FIG. 6 is a flowchart showing a step of saving a video according to embodiment 3.

FIG. 6 is a flowchart showing a step of saving a video according to embodiment 3. First, when a new marking event is detected (Y in S70), the recording control unit 20 records a point of time of detection thereof in the recording medium 48 (S72). When a new marking event is not detected (N in S70), and when a new trigger event is not detected, either (N in S74), control returns to the start of the flow, and the point of time of detection of a marking event is recorded every time it is detected (Y in S70, S72). When a new trigger event is detected (Y in S74), and when the point of time of detection thereof is within the standby period from the point of time of detection of the marking event (Y in S76), it is defined that the data for a period before and after the marking event and the data for a period before and after the trigger event should be saved in the form of one continuous item of video data (S78). This represents the second determination method. When the point of time of detection of a new trigger event is not within the standby period from the point of time of detection of the marking event (N in S76), it is defined that the data for a period before and after the marking event closest in time and the data for a period before and after the trigger event should be associated with each other and saved as separate video data (S80). This represents a variation to the third determination method. "The marking event closest in time" may be one marking event or a plurality of marking events. In this embodiment, the first determination method is not employed.

According to the embodiments described above, the period of time tracked back to find a point of start of video data that should be saved can be extended in accordance with the actual duration of the period of time from the marking event to the trigger event so as to avoid saving video for a long period of time purposelessly. Further, the standby period can be set to the most appropriate time to suit the overall capacity of the memory card or the situation of the available capacity so that depletion of the available capacity of the memory card is avoided. Further, it can be defined that the video of an event that may have certain relevance to an accident or a trouble should be saved when a trigger event occurs after an elapse of a period of time longer than the first standby period since the detection of the marking event. In that case, it is also possible to avoid wastefully saving a video extending over a long period of time and irrelevant to an accident or a trouble that could be located between the marking event and the trigger event. Consequently, it allows ex-post inclusion, in the data that should be saved, of a video of an extensive range of minor events for which it is not clear whether the event is relevant to an accident or a trouble at the time of detection. It also allows efficiently saving of an extensive range of data that should be saved, without burdening the memory card.

Given above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. A recording control apparatus comprising:
a video acquirer that acquires video data capturing a scene around a vehicle;
a recording controller that is adapted to record the video data in a predetermined area and define that at least a portion of the video data to be saved; and
an event detector that detects occurrence of a predefined event including a save-triggering event and a marking event,
wherein the save-triggering event is defined to trigger saving of the video data, and
wherein the marking event, different from the save-triggering event, is defined as a point of time of detection to be recorded, and
wherein the recording controller:
records, when the event detector detects the marking event, the point of time of detection of the marking event, and
defines, when the event detector detects the save-triggering event within a standby period defined in association with the marking event after detection of the marking event, that video data including a video at the point of time of detection of the marking event and a video at a point of time of detection of the save-triggering event to be saved.

2. The recording control apparatus according to claim 1, wherein when the event detector detects the save-triggering event within the standby period defined in association with the marking event after the detection of the marking event, the recording controller defines that continuous video data for a period of time including both the point of time of detection of the marking event and the point of time of detection of the save-triggering event.

3. The recording control apparatus according to claim 1, wherein the recording controller further:

defines, when the event detector detects the save-triggering event within a first standby period defined in association with the marking event after the detection of the marking event, that continuous video data for a period including both the point of time of detection of the marking event and the point of time of detection of the save-triggering event to be saved, and defines, when the event detector detects the save-triggering event within a second standby period, defined in association with the marking event and longer than the first standby period, after the detection of the marking event, that video data including a video at the point of time of detection of the marking event and video data including a video at the point of time of detection of the save-triggering event to be associated with each other and saved respectively.

4. The recording control apparatus according to claim 1, wherein the event detector is adapted to detect occurrence of a plurality of types of events as events not triggering saving, and individual standby periods are defined for respective types of events not triggering saving.

5. The recording control apparatus according to claim 2, wherein the event detector is adapted to detect occurrence of a plurality of types of events as marking events, and individual standby periods are defined for respective types of marking events.

6. The recording control apparatus according to claim 3, wherein the event detector is adapted to detect occurrence of a plurality of types of events as marking events, and individual standby periods are defined for respective types of marking events.

7. A recording control method comprising:

acquiring video data capturing a scene around a vehicle;

recording the video data in a predetermined area;

when occurrence of a save-triggering event predefined to trigger saving of the video data is detected, defining that video data including a point of time of detection of the save-triggering event to be saved; and defining, when occurrence of an marking event, which is different from the save-triggering event and for which it is defined that a point of time of detection thereof should be recorded, is detected as an event and when the save-triggering event is detected within a standby period defined in association with the marking event after detection of the marking event, that video data including the point of time of detection of the marking event and the point of time of detection of the save-triggering event to be saved.

8. A non-transitory computer-readable storage medium storing a recording control program comprising computer-implemented modules including:

a module that acquires video data capturing a scene around a vehicle;

a module that records the video data in a predetermined area and define that at least a portion of the video data should be saved; and a module that detects occurrence of a predefined event, wherein the module that detects that an event occurs, when a save-triggering event, which is defined to trigger saving of the video data, occurs or when an marking event, which is different from the save-triggering event and for which it is defined that a point of time of detection thereof to be recorded, occurs, and the module that records:

records, when the module that detects the marking event, the point of time of detection of the marking event, and defines, when the module that detects the save-triggering event within a standby period defined in association with the marking event detection of the marking event, that video data including a video at the point of time of detection of the marking event and a video at a point of time of detection of the save-triggering event to be saved.

* * * * *